United States Patent
Park et al.

(10) Patent No.: US 6,910,218 B2
(45) Date of Patent: Jun. 21, 2005

(54) SLIM TYPE OPTICAL DISC DRIVE

(75) Inventors: Dae-kyong Park, Gyeonggi-do (KR); Bu-hyun Sung, Gyeonggi-do (KR); Dong-seob Jang, Seoul (KR); Gyu-chan Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 10/288,459

(22) Filed: Nov. 6, 2002

(65) Prior Publication Data

US 2003/0086358 A1 May 8, 2003

(30) Foreign Application Priority Data

Nov. 8, 2001 (KR) ........................................ 2001-69500

(51) Int. Cl.[7] ............................................. G11B 33/02
(52) U.S. Cl. ...................................... 720/653; 720/613
(58) Field of Search .............................. 720/601, 613, 720/652–653; 369/752, 247

(56) References Cited

U.S. PATENT DOCUMENTS

| | | | | |
|---|---|---|---|---|
| 4,661,940 A | * | 4/1987 | Camerik ..................... | 369/111 |
| 5,216,558 A | * | 6/1993 | Griffith et al. ........... | 360/99.06 |
| 6,002,659 A | * | 12/1999 | Ogusu et al. ............... | 369/75.2 |
| 6,044,057 A | * | 3/2000 | Park et al. .................. | 369/219 |
| 6,151,284 A | * | 11/2000 | Watanabe et al. .......... | 369/75.2 |
| 6,320,835 B1 | * | 11/2001 | Kamei ....................... | 369/75.1 |
| 6,341,115 B1 | * | 1/2002 | Otani et al. ................ | 369/77.1 |
| 6,603,723 B2 | * | 8/2003 | Minase ...................... | 369/75.2 |
| 6,646,977 B2 | * | 11/2003 | Chen et al. ................ | 369/247 |

FOREIGN PATENT DOCUMENTS

JP        09251769 A * 9/1997 ........... G11B/33/12

* cited by examiner

*Primary Examiner*—Brian E. Miller
(74) *Attorney, Agent, or Firm*—Stein, McEwen & Bui, LLP (57) ABSTRACT

In a slim type optical disc drive, an optical pickup unit and an optical pickup transport assembly are installed on a main base disposed in a housing having a lower case and an upper case. A spindle motor is mounted on a tray so as to slide in and out of the housing. A spindle motor printed circuit board is mounted on the tray, and a main printed circuit board is fixed to the lower case. A flexible printed circuit connects the spindle motor and main printed circuits boards. The tray includes a table which supports the spindle motor, and side frame bars located at sides of the tray and spaced apart from the table. A pair of guide ribs are arranged in the housing to guide the movement of the table. In the slim type optical disc drive, only the spindle motor is disposed on the tray.

25 Claims, 7 Drawing Sheets

SLIM TYPE OPTICAL DISC DRIVE

CROSS-REFERENCE TO RELATED APPLICATION

This application claims the benefit of Korean Application No. 2001-69500, filed Nov. 8, 2001 in the Korean Intellectual Property Office, the disclosure of which is incorporated herein by reference.

BACKGROUND OF THE INVENTION

1. Field of the Invention

The present invention relates to an optical disc drive, and more particularly, to a slim type optical disc drive that has a simple construction, and allows a tray to be more easily carried and a disc to be more easily loaded and unloaded.

2. Description of the Related Art

As is generally known in the art, an optical disc drive records and reproduces information using light incident on a recording medium such as a compact disc (CD) or a digital versatile disc (DVD). Optical disc drives are generally used in computers and especially in notebook computers, a slim type optical disc drive of very small thickness is used.

Figure 1:
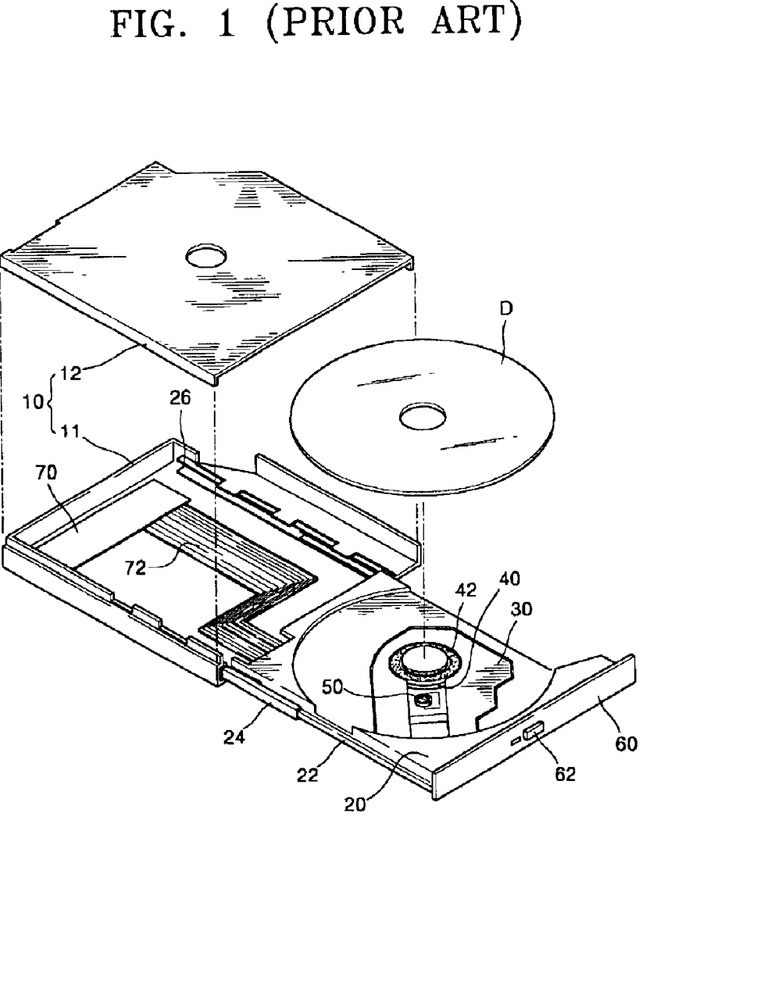
FIG. 1 is an exploded perspective view schematically illustrating the construction of a conventional slim type optical disc drive.
Figure 2A:
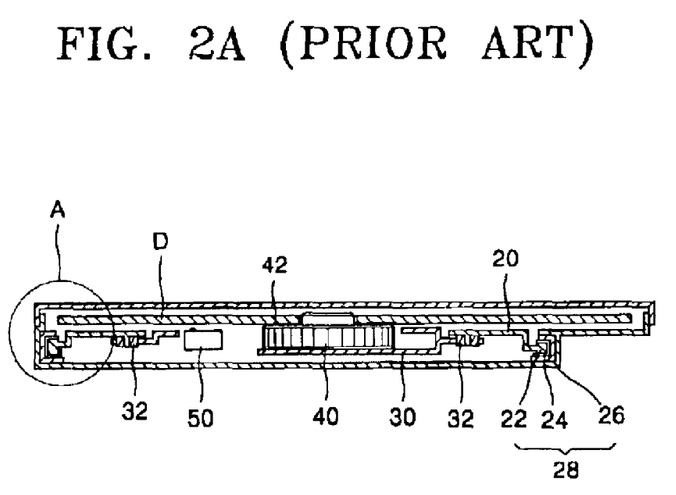
FIG. 2A is a vertical transverse section schematically illustrating the slim type optical disc drive of FIG. 1 in which a disc is loaded.

FIG. 1 is an exploded perspective view schematically illustrating the construction of a conventional slim type optical disc drive. FIG. 2A is a vertical transverse section schematically illustrating the slim type optical disc drive of FIG. 1, loaded with a disc, and FIG. 2B is an enlarged view of the part A of FIG. 2A.

Figure 2B:
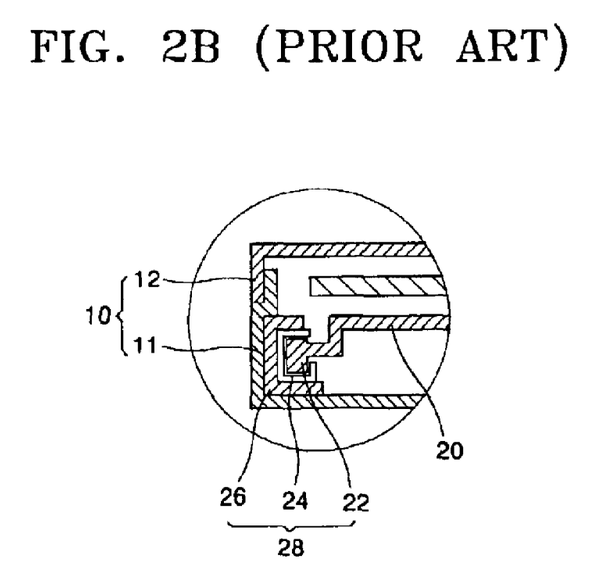
FIG. 2B is an enlarged view of the part A of FIG. 2A.

Referring to FIGS. 1 through 2B, the conventional slim type optical disc drive includes a housing 10 having a lower case 11 and an upper case 12, and a tray 20 mounted in the housing 10 to slide in and out of the housing 10. A main base 30 is assembled with the tray 20 using vibration-proof rubber members 32 interposed between the tray 20 and the main base 30. A spindle motor 40 rotates a disc D. An optical pickup unit 50 records and reproduces data onto and from the rotating disc D. A pickup transport (not shown) carries the optical pickup unit 50 along the radius of the disc D. The spindle motor 40, the optical pickup unit 50, and the pickup transport are installed to the main base 30. A turntable 42, onto which the disc D is mounted, is provided on the spindle motor 40. The spindle motor 40 and the optical pickup unit 50 are installed in the tray 20 so that they also slide in and out of the housing 10 with the tray 20.

Further, the optical disc drive is provided with tray guiding units 28 which guide the movement of the tray 20 as described above. The tray guiding units 28 include rail assembling portions 22 formed at both sides of the tray 20, sliding rails 24 slidably assembled with the rail assembling portions 22, and rail guides 26 fixed at both corners of the lower case 11 so as to slidably support the sliding rails 24. A locking apparatus (not shown) is used to lock the tray 20 into the housing 10, and an ejector (not shown) is used to eject the tray 20 from the housing 10. The locking apparatus and the ejector are disposed in the housing 10 and on the lower surface of the tray 20. An eject button 62 to operate the ejector is arranged on the front face bezel 60 of the tray 20.

A main printed circuit board 70 provides an interface between the optical disc drive and external devices and is fixed to the lower case 11. Further, the main printed circuit board 70, the spindle motor 40 and the optical pickup unit 50 are electrically interconnected through a flexible printed circuit 72.

When the disc D is loaded into the slim type optical disc drive constructed as described above, after the tray 20 is drawn out of the housing 10, the disc D is seated on a turntable 42 and then pushed into the housing 10. Then, the locking apparatus is operated to lock the tray 20 into the housing 10. When the disc D is unloaded, the eject button 62 is pressed to operate the ejector, which pushes the tray 20 out of the housing 10.

However, in the conventional slim type optical disc drive, the spindle motor 40, the optical pickup unit 50, and the pickup transport are all installed in the tray 20, making the tray 20 heavy and complicated as well as thick. Further, the extra weight of the spindle motor 40, the optical pickup unit 50, and the pickup transport, which slide out together with the tray 20, prevent the smooth movement of the tray 20 and require the tray 20 and the tray guiding units 28 to be relatively thick. Therefore, there are limits to slimming the conventional optical disc drive.

Further, when designing the complicated construction described above, it is difficult to maintain a gap between the disc D and the tray 20, which is necessary to prevent the disc D from contacting the tray 20 due to vibrations. Moreover, when attempting to reduce a vibration of the spindle motor 40, which is the main source of the vibrations, it is difficult to find the vibration transmission path in the tray 20, which further complicates the design for reducing the vibrations.

Additionally, the flexible printed circuit 72 which connects the fixed main printed circuit board 70 to the movable spindle motor 40 and the optical pickup unit 50 may contact the tray 20 and wear away while the tray 20 is moving in and out of the housing, reducing durability or causing faults.

SUMMARY OF THE INVENTION

To solve the above and other problems, it is an object of the present invention to provide a slim type optical disc drive in which only a spindle motor is installed on a tray, while an optical pickup unit and a pickup transport are disposed in a housing, so that the overall construction of the optical disc drive is simplified, the tray can be more easily carried, and a disc can be more easily loaded and unloaded.

Additional objects and advantages of the invention will be set forth in part in the description which follows and, in part, will be obvious from the description, or may be learned by practice of the invention.

In order to accomplish the above and other objects, an embodiment of the present invention includes a slim type optical disc drive including a housing including a lower case and an upper case, a main base on which are installed an optical pickup unit for recording and reproducing data onto and from a rotating disc, and an optical pickup transport assembly for moving the optical pickup unit, the main base being disposed in the housing; a tray on which a spindle motor for rotating the disc is installed, the tray being disposed to slide in and out of the housing, and a control circuit including a main printed circuit board fixed to the lower case, a spindle motor printed circuit board located on the tray to control the spindle motor, and a flexible printed circuit interconnecting the main printed circuit board and the spindle motor printed circuit board.

According to an aspect of the invention, the main base is located at a rear portion of the housing on the lower case.

According to another aspect of the invention, vibration-proof rubber members are interposed between the lower case and the main base so as to buffer and prevent external impact or vibration from being directly transmitted to the main base.

According to yet another aspect of the invention, the main base is spaced a predetermined distance apart from a surface of the lower case the vibration-proof rubber members.

According to still yet another aspect of the invention, the tray comprises a table elongated in the direction of movement of the tray, side frame bars at both sides of the tray spaced a predetermined distance apart from the table, and a front face bezel fixed to the front ends of the table and the side frame bars.

According to a further aspect of the invention, empty spaces are formed between the table and the side frame bars such that, when the tray has been drawn out of the housing, the empty space under the disc allows easy access for loading and unloading the disc.

According to a yet further aspect of the invention, the slim type optical disc drive further comprises a tray guiding unit for supporting the side frame bars and guiding the movement of the tray, which comprises sliding rails slidably assembled with the side frame bars of the tray, and rail guides fixed at both corners of the lower case to slidably support the sliding rails.

According to a still further aspect of the invention, the slim type optical disc drive further comprises a table guiding unit for guiding the movement of the table when the tray moves, disposed in the housing and which comprises a pair of guide ribs that protrude from the upper surface of the lower case, and in which both side edges of the table are slidably fitted.

According to a still yet further aspect of the invention, the tray is provided with a cover to prevent the flexible printed circuit from interfering with the guide ribs and coming into contact with the lower surface of the disc.

According to an additional aspect of the invention, the cover comprises a parallel portion extending parallel to the direction in which the tray moves, and a perpendicular portion extending perpendicular thereto, where the ends of the cover are respectively fixed to the upper surface of the table and the rear surface of the front face bezel.

According to a yet additional aspect of the invention, the perpendicular portion of the cover has a lower surface attached to a portion of the flexible printed circuit, to prevent the flexible printed circuit from interfering with the guide ribs, and the parallel portion of the cover prevents the flexible printed circuit from being bent and contacting the lower surface of the disc when the tray moves into the housing.

According to a still additional aspect of the invention, the cover is disposed between the spindle motor and the front face bezel, to avoid interference with the main base when the tray is inserted into the housing.

According to a still yet additional aspect of the invention, the cover is located above the upper surfaces of the guide ribs, to avoid interference with the guide ribs.

According to another aspect of the invention, the cover is spaced at least one millimeter apart from the lower surface of the disc seated on the turntable of the spindle motor, to prevent the lower surface of the disc from contacting the cover due to vibration of the disc when the disc rotates.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Hereinafter, embodiments of the present invention will be described with reference to the accompanying drawings, examples of which are illustrated in the accompanying drawings, wherein like reference numerals refer to the like elements throughout. The embodiments are described below in order to explain the present invention by referring to the figures.

Figure 3:
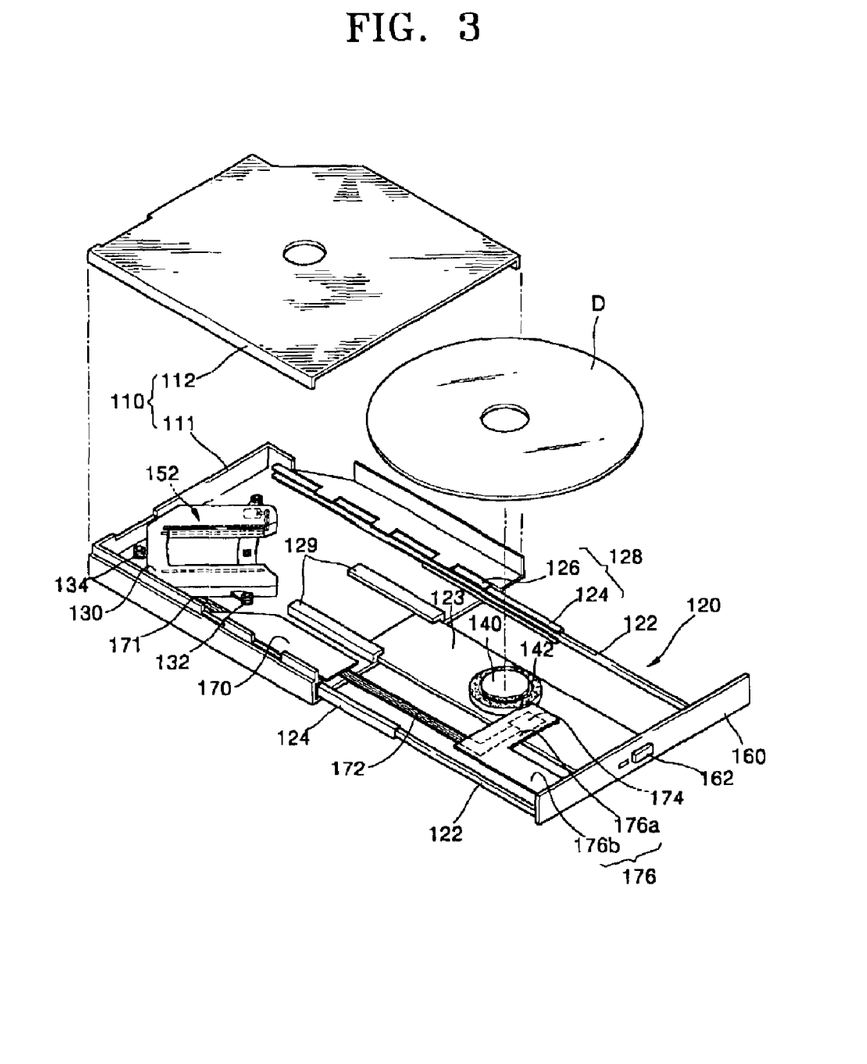
FIG. 3 is an exploded perspective view illustrating the construction of a slim type optical disc drive according to an embodiment of the present invention.
Figure 4A:
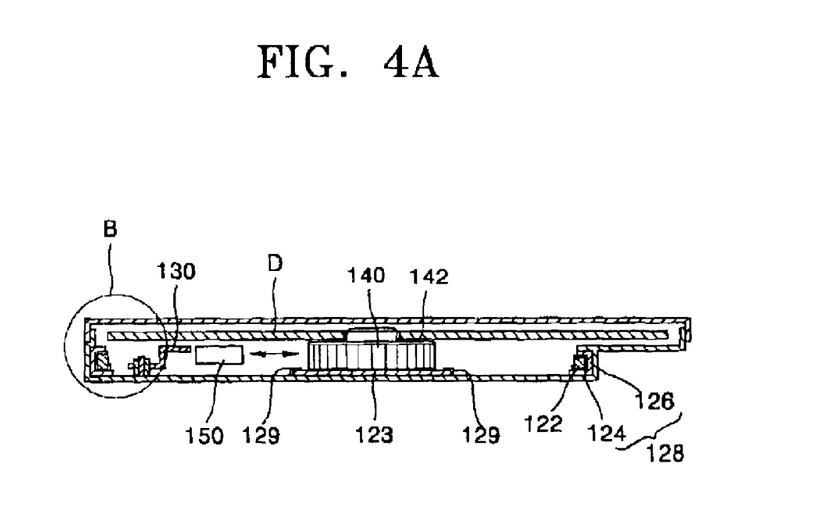
FIG. 4A is a vertical transverse section schematically illustrating the slim type optical disc drive of FIG. 3 in which a disc is loaded.
Figure 4B:
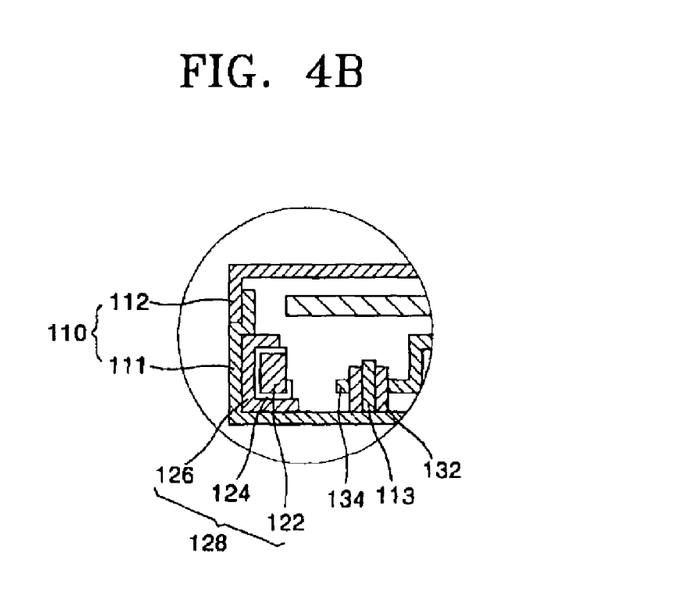
FIG. 4B is an enlarged view of the part B of FIG. 4A.

FIG. 3 is an exploded perspective view illustrating the construction of a slim type optical disc drive according to an embodiment of the present invention. FIG. 4A is a vertical transverse section schematically illustrating the slim type optical disc drive of FIG. 3 in which a disc is loaded, and FIG. 4B is an enlarged view of the part B of FIG. 4A. Referring to FIGS. 3 through 4B, the slim type optical disc drive includes a housing 110 having a lower case 111 and an upper case 112, and a tray 120 that slides in and out of the housing 110. A main base 130 is located on the lower case 111 in the housing 110, at the rear portion of the housing 110 to prevent the main base 130 from interfering with other elements which will be described hereinafter.

In order to buffer and prevent external impacts and/or vibrations from being directly transmitted to the main base 130, vibration-proof rubber members 132 are interposed between the lower case 111 and the main base 130. In order to further buffer from the external impacts and/or vibrations, protuberances 113 protrude from the lower case 111 and are inserted into hollows of the vibration-proof rubber members 132. Fixing portions 134 are arranged on the main base 130 to fit around the vibration-proof rubber members 132.

The main base 130 is spaced a predetermined distance apart from the surface of the lower case 111 by the vibration-proof rubber members 132, to prevent a table 123 carrying a spindle motor 140, which will be described below, from interfering with the main base 130 when the table 123 comes into the housing 110 from an external position where disc D is received. That is, the table 123 passes through a plane between the lower case 111 and the main base 130. Also, the protuberances 113 protruding from the lower case 111 are arranged to form a passage through which the table 123 moves, to prevent the protuberances 113 from interfering with the table 123.

The main base 130 includes an optical pickup unit 150 for recording and reproducing data onto and from the rotating disc D, and an optical pickup transport assembly 152 for moving the optical pickup unit 150 along the radius of the disc D.

Figure 5:
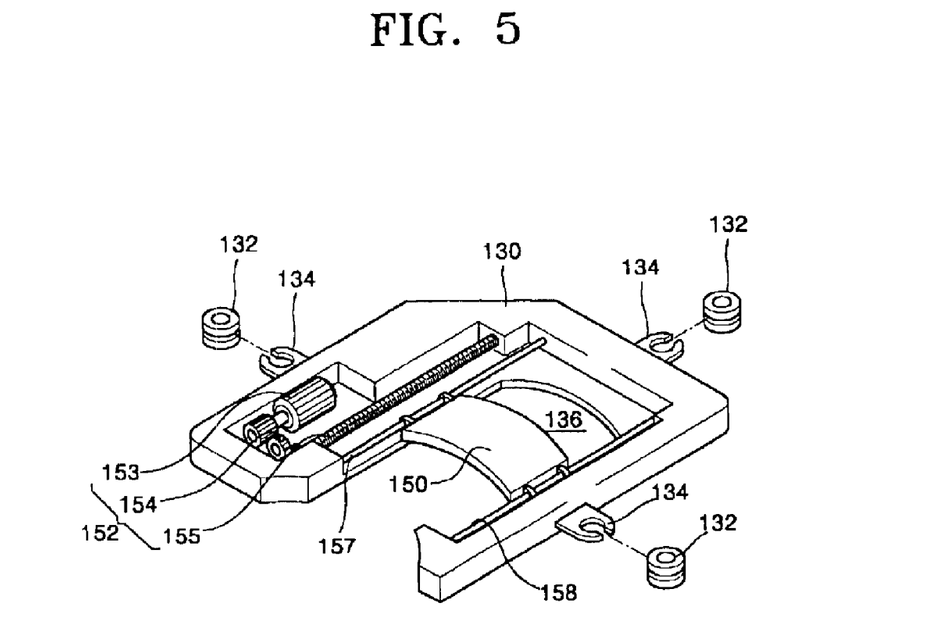
FIG. 5 is a bottom perspective view of a main base assembly used in the slim type optical disc drive of FIG. 3.

FIG. 5 shows an embodiment of the assembly and construction of the main base 130 and the optical pickup unit 150. Referring to FIG. 5, as described above, the fixing portions 134 are formed at the side surface of the main base 130 to fit around the vibration-proof rubber members 132 so that the main base 130 can be mounted in the lower case 111. Further, the main base 130 has a central space 136 that is elongated in the radial direction of the disc. The optical pickup unit 150 moves along the central space 136 in the radial direction of the disc D. The optical pickup unit 150 is mounted to and guided along guide shafts 157 and 158 located at both sides of the central space 136.

The optical pickup transport assembly 152, which moves the optical pickup unit, 150 is located in the main base 130. The optical pickup transport assembly 152 includes a lead screw 155 for linearly moving the optical pickup unit 150 through its rotation, a drive motor 153, and a connecting gear group 154 for transferring the driving force of the drive motor 153 to the lead screw 155. However, it is understood that other types of vibration reduction devices and optical pickup transport assemblies can be used.

Referring again to FIGS. 3 through 4B, the tray 120 includes the table 123 in the middle portion of the tray 120. Side frame bars 122 are on both sides of the tray 120, spaced a predetermined distance apart from the table 123 so as to form corresponding gaps therebetween. The front ends of the table 123 and the side frame bars 122 are fixed to a front face bezel 160. The table 123 has the shape of a thin plate elongated in the direction in which the tray 120 moves. The spindle motor 140 for rotating the disc D is mounted on the table 123. Therefore, the spindle motor 140 is supported by the table 123, so that the spindle motor 140 moves in and out of the housing 110 together with the tray 120. A turntable 142, on which the disc D is seated, is mounted on the upper surface of the spindle motor 140. As described above, most of the tray 120, except for the table 123 and the side frame bars 122, is an empty space, which allows for easy access for loading and unloading the disc D. However, it is understood that the table 123 need not form the empty space on one or both sides of the table in all aspects of the invention and could be a solid tray.

Further, the shown side frame bars 122 of the tray 120 have the shape of rectangular bars, and are supported by tray guiding means 128. The tray guiding means 128 includes sliding rails 124 slidably assembled with the side frame bars 122 of the tray 120. Rail guides 126 are fixed at both corners of the lower case 111 to slidably support the sliding rails 124. In this way, the sliding rails 124 connect the lower case 111 of the housing 110 to the side frame bars 122 of the tray 120.

Moreover, a table guiding unit is arranged in the housing 110 to guide the movement of the table 123 carrying the spindle motor 140 when the tray 120 moves. The shown table guiding unit is a pair of guide ribs 129, in which both side edges of the table 123 are slidably fitted, protruding from the upper surface of the lower case 111. The guide ribs 129 are parallel to each other, so that the table 123 slides between the guide ribs 129. The space between the guide ribs 129 is determined to prevent the tray 120 from interfering with the spindle motor 140 when moving. However, the table guiding unit can be otherwise constructed. Further, it is understood that the table guiding unit can be constructed such that the table 123 alone is used wherein the side frame bars 122 are not required in all aspects of the invention.

As described above, the present invention has the spindle motor 140 mounted on the tray 120 to slide out of the housing 110 together with the tray 120, while the optical pickup unit 150 and the optical pickup transport assembly 152 are mounted on the main base 130 so as to be fixed to the lower case 111. Therefore, the overall weight of the tray 120 is reduced, allowing the tray 120 to slide more smoothly and be thinner, thereby realizing a lighter, slimmer optical disc drive.

In the meantime, although not shown, a locking apparatus for locking the tray 120 into the housing 110, and an ejector for ejecting the tray 120 out of the housing 110, are disposed in the housing 110 and the tray 120, and an eject button 162 for operating the ejector is arranged on the front face bezel 160 of the tray 120.

A main printed circuit board 170 which interfaces the optical disc drive with external devices is disposed in the housing 110. The main printed circuit board 170 is located in an empty space beside the guide ribs 129, and is fixed to the lower case 111. Also, a printed circuit 171 to electrically connect the main printed circuit board 170 to the optical pickup unit 150 and the optical pickup transport assembly 152, is mounted on the upper surface of the lower case 111. Also, a flexible printed circuit 172, which bends and/or spreads, is included to electrically connect the fixed main printed circuit board 170 to a spindle motor printed circuit board 174 controlling the spindle motor 140 and moving together with the tray 120. The flexible printed circuit 172 is used since the distance between the main printed circuit board 170 and the spindle motor printed circuit board 174 changes according to the movement of the spindle motor 140. It is understood that the fixed printed circuit board 171 can be mounted to a lower surface of the main base 130 or elsewhere in the housing 110.

During the movement of the tray 120, the flexible printed circuit 172 may interfere with the guide ribs 129 which guide the table 123 on which the spindle motor 140 is mounted, and may also contact the lower surface of the disc D seated on the turntable 142 of the spindle motor 140. Therefore, a cover 176 is included to prevent such interference and contact. The cover 176 includes a parallel portion 176b extending parallel to the direction in which the tray 120 moves, and a perpendicular portion 176a extending perpendicular thereto, so that the cover 176 is shaped substantially like the letter "L." One end of the perpendicular portion 176a is fixed to the upper surface of the table 123, and one end of the parallel portion 176b is fixed to the rear surface of the front face bezel 160, so that the cover 176 is supported and fixed by the tray 120. The cover 176 is located in front of the spindle motor 140 (i.e., at the side of the front face bezel 160) to prevent the cover 176 from interfering with the main base 130 when the tray 120 is inserted into the housing 110. It is understood that the cover 176 need not be used in all aspects of the invention and can have other shapes, such as rectangular or rounded shapes so long as the cover 176 provides the same protection.

Figure 6:
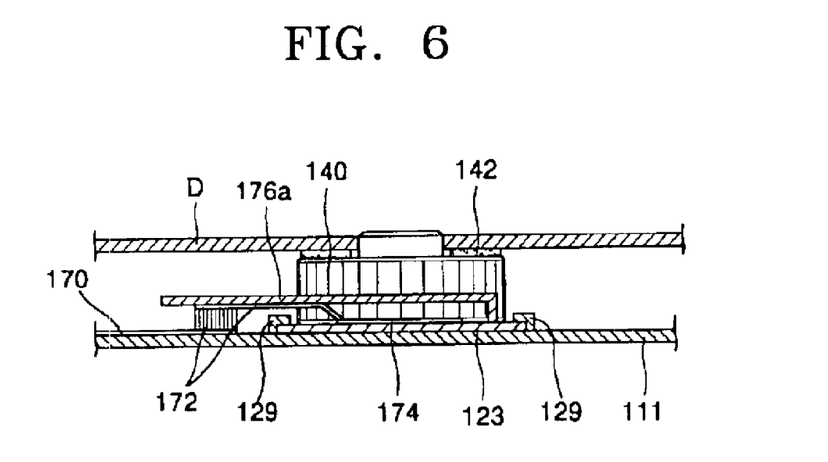
FIG. 6 is a partial vertical section illustrating the construction of a flexible printed circuit and a cover used in the slim type optical disc drive of FIG. 3.

FIG. 6 shows the detailed construction of the flexible printed circuit 172 and the cover 176. Referring to FIG. 6, the perpendicular portion 176a of the cover 176 is higher than the upper surfaces of the guide ribs 129 so as to avoid interfering with the guide ribs 129. The shown spacing between the upper surfaces of the guide ribs 129 and a lower surface of the perpendicular portion 176a is designed to be larger than the thickness of the flexible printed circuit 172. A height of the perpendicular portion 176a is designed to allow a spacing of at least one millimeter (preferably about 1.3 millimeters) from the lower surface of the disc D when seated on the turntable 142 of the spindle motor 140. This dimension is necessary in order to prevent the lower surface of the disc D (i.e., the recording surface) from contacting the perpendicular portion 176a of the cover 176 when the disc D rotates.

Ends of the flexible printed circuit 172 are respectively connected to the main printed circuit board 170 and the spindle motor printed circuit board 174. However, only a portion of the flexible printed circuit 172 adjacent to the spindle motor printed circuit board 174 is attached to the lower surface of the perpendicular portion 176a. The other portion of the spindle motor printed circuit board 174 is maintained flexible so as to be freely bent. Therefore, when the tray 120 moves into the housing 110, the flexible printed circuit 172 is prevented from interfering with the guide ribs 129.

Figure 7A:
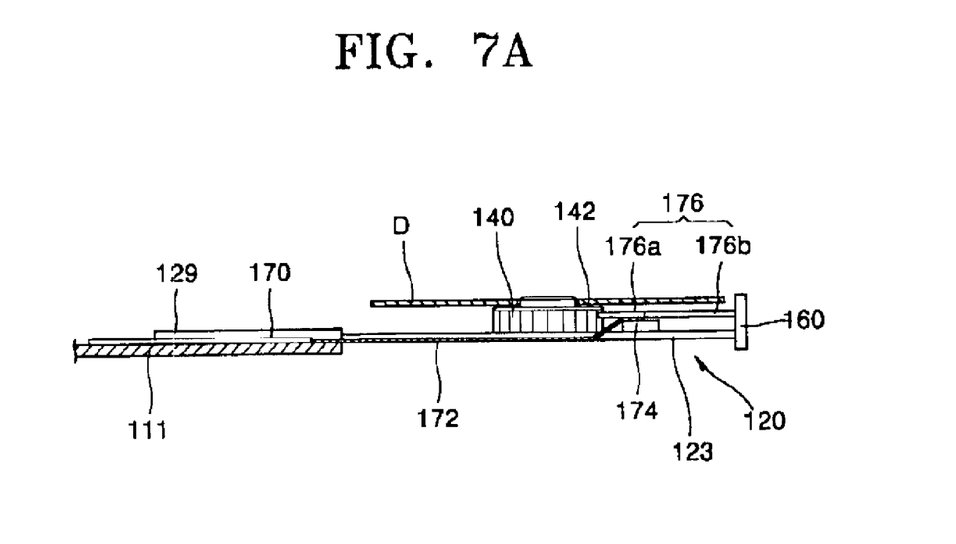
FIGS. 7A to 7C are sectional views for describing the function of a parallel portion of the cover and the deformation of the flexible printed circuit according to the movement of the tray, used in the slim type optical disc drive of FIG. 3.
Figure 7B:
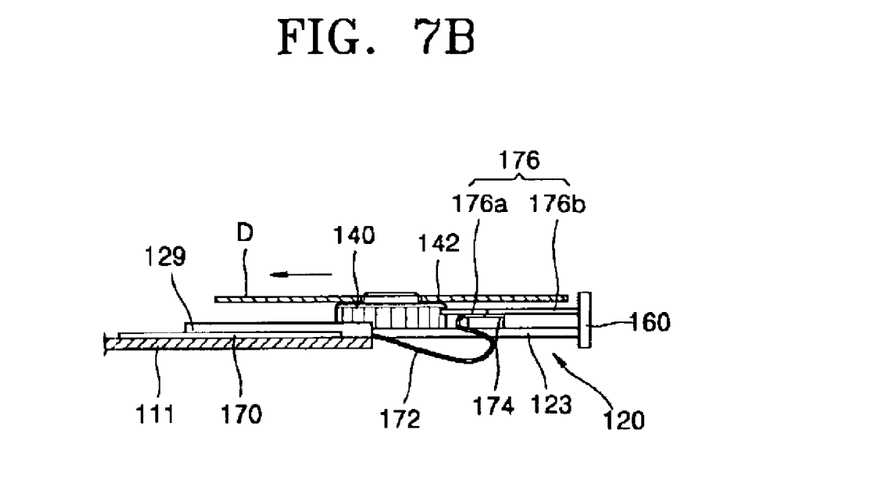
Figure 7C:
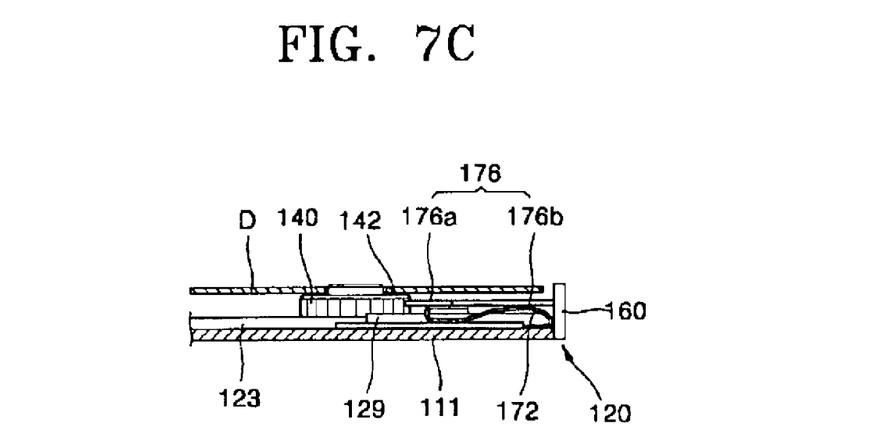

Meanwhile, FIGS. 7A to 7C are sectional views describing the function of the parallel portion 176b of the cover 176 and the deformation of the flexible printed circuit 172 according to the movement of the tray 120. Referring to FIG. 7A, when the tray 120 is drawn out of the housing 110, the flexible printed circuit 172, which is connected between the main printed circuit board 170 and the spindle motor printed circuit board 174, is in a somewhat strained state. From this strained state, after the disc D is seated on the turntable 142 of the spindle motor 140 and the tray 120 is pushed as shown by an arrow in FIG. 7B, the flexible printed circuit 172 is bent as the tray 120 advances into the housing 110. In shown embodiment, the flexible printed circuit 172 bends freely without interfering with other elements since there is an empty space under the flexible printed circuit 172.

Thereafter, when the tray 120 has moved completely into the housing 110 as shown in FIG. 7C, the flexible printed circuit 172 is further bent. In the shown embodiment, the parallel portion 176b of the cover 176 prevents the bent flexible printed circuit 172 from contacting the lower surface of the disc D. In addition, during this process, since the flexible printed circuit 172 is attached to the lower surface of the perpendicular portion 176a of the cover 176, which is higher than the guide ribs 129, the flexible printed circuit 172 is prevented from interfering with the guide ribs 129.

The slim type optical disc drive according to the present invention as described above has the following and other advantages. Since only the spindle motor is mounted on the tray, the overall weight of the tray is reduced, enabling the tray to be thinner and move more smoothly, thereby realizing a lighter, slimmer optical disc drive. Also, since the tray has a relatively simple construction, the slim type optical disc drive is cheaper to manufacture.

Further, the flexible printed circuit only connects the, main printed circuit board to the spindle motor circuit board, and the flexible printed circuit can thus be narrower and cheaper than in the conventional optical disc drive. There is also a reduced likelihood of wear and breakage of the flexible printed circuit by contact with other elements.

Also, when the tray has been drawn out of the housing, the portion under the disc is an empty space, allowing easy access for loading and unloading.

Additionally, since the tray has a relatively simple construction, it is easier to find the vibration transmission path from the spindle motor, which aids in designing a way to reduce vibrations.

While this invention has been particularly shown and described with reference to embodiments thereof, it will be understood by those skilled in the art that various changes in form and details may be made therein without departing from the spirit and scope thereof as defined by the accompanying claims and equivalents thereof.

What is claimed is:

1. A slim type optical disc drive comprising:
   a housing including a lower case and an upper case and an opening;
   a main base disposed in the housing and on which are installed an optical pickup unit to record and/or reproduce data with respect to a rotating disc, and an optical pickup transport assembly to move the optical pickup unit;
   a tray that is slideable in and out of the housing through the opening;
   a spindle motor to rotate the disc and which is installed on the tray; and
   a control circuit including a main printed circuit board fixed to the lower case, a spindle motor printed circuit board located on the tray to control the spindle motor, and a flexible printed circuit interconnecting the main printed circuit board and the spindle motor printed circuit board, wherein the tray comprises:
   a table elongated in a direction along which the tray moves and which supports the spindle motor,
   side frame bars disposed at sides of the tray, each of the side frame bars being spaced a predetermined distance apart from the table, and
   a front face bezel to which front ends of the table and the side frame bars are fixed.

2. The slim type optical disc drive as claimed in claim 1, wherein each of the side frame bars and the table define an empty space therebetween.

3. The slim type optical disc drive as claimed in claim 1, further comprising a tray guiding unit to support the side frame bars and to guide a movement of the tray in the direction.

4. The slim type optical disc drive as claimed in claim 3, wherein the tray guiding unit:
   comprises sliding rails slidably connected with the corresponding side frame bars of the tray, and
   rail guides fixed at corresponding opposite sides of the lower case to slidably support the sliding rails.

5. The slim type optical disc drive as claimed in claim 1, wherein the spindle motor printed circuit board is mounted on the table.

6. The slim type optical disc drive as claimed in claim 1, further comprising a table guiding unit to guide a movement of the table when the tray moves in the direction, the table guiding unit being disposed in the housing.

7. The slim type optical disc drive as claimed in claim 6, wherein the table guiding unit comprises a pair of guide ribs which protrude from an upper surface of the lower case and in which corresponding opposite side edges of the table are slidably fitted.

8. The slim type optical disc drive as claimed in claim 7, wherein the guide ribs are parallel to each other and spaced apart so as to prevent the guide ribs from interfering with the spindle motor while the tray moves in the direction.

9. The slim type optical disc drive as claimed in claim 7, wherein the tray further comprises a cover to prevent the flexible printed circuit from interfering with the guide ribs and contacting a lower surface of the disc.

10. The slim type optical disc drive as claimed in claim 9, wherein:
   the cover comprises a first portion elongated in a first direction parallel to the direction in which the tray moves, and a second portion co-planar with the first portion and extending from the first portion in a second direction perpendicular to the first direction of the first portion,
   a first end of the cover is fixed to an upper surface of the table, and a second end of the cover is fixed to a rear surface of the front face bezel.

11. The slim type optical disc drive as claimed in claim 10, wherein:
the second portion comprises a lower surface attached to a portion of the flexible printed circuit so as to prevent the flexible printed circuit from interfering with the guide ribs as the tray moves in the direction, and
the first portion prevents the flexible printed circuit from being bent and contacting the lower surface of the disc when the tray moves in the direction into the housing.

12. The slim type optical disc drive as claimed in claim 9, wherein the cover is located between the spindle motor and the front face bezel to avoid interference with the main base when the tray is inserted into the housing in the direction.

13. The slim type optical disc drive as claimed in claim 9, wherein the cover is disposed above upper surfaces of the guide ribs so as to avoid interference with the guide ribs.

14. The slim type optical disc drive as claimed in claim 9, wherein:
the spindle motor further comprises a turntable on which the disc is seated, and
the cover is spaced at least one millimeter apart from the lower surface of the disc when seated on the turntable so as to prevent the lower surface of the disc from contacting the cover due to disc vibrations when the disc rotates.

15. The slim type optical disc drive as claimed in claim 1, wherein the main base is located at a rear portion of the lower case.

16. The slim type optical disc drive as claimed in claim 1, further comprising vibration-proof rubber members between the lower case and the main base, to prevent vibrations from being directly transmitted to the main base.

17. The slim type optical disc drive as claimed in claim 1, wherein:
each of the vibration-proof rubber members includes a hollow portion,
protuberances protrude from the lower case and are inserted into the corresponding hollow portions of the vibration-proof rubber members, and
the main base includes fixing portions which fit around the corresponding vibration-proof rubber members so as to attach the vibration-proof rubber members to the main base.

18. The slim type optical disc drive as claimed in claim 1, wherein the vibration-proof rubber members separate the main base from a surface of the lower case.

19. A slim type optical disc drive comprising:
a housing;
a main base mounted at the housing and on which are installed an optical pickup unit to record and/or reproduce data with respect to a rotating disc;
a table being slideable within the housing relative to the main base so as to move a disc received at a first position to a second position at which the optical pickup unit records and/or reproduces data with respect to the disc;
a spindle motor which is movable with the table, the spindle motor to receive the disc at the first position and to rotate the disc at the second position;
a control circuit mounted at the housing and which is connected to the spindle motor on the tray so as to control the spindle motor to rotate the disc while at the second position;
side rails disposed at adjacent sides of the table; and
a connector which connects the side rails to the table,
wherein the side rails are slideably received by the housing so as to guide a movement of the table between the first and second positions, and the side rails, the connector, and the sides of the table form gaps therebetween.

20. The slim type optical disc drive of claim 19, wherein the sides of the table are slideably received in the housing so as to guide the movement of the table between the first and second positions.

21. The slim type optical disc drive of claim 19, wherein the control circuit comprises a flexible portion which is connected between the housing and the spindle motor such that the control circuit is connected to the spindle motor at the first and second positions.

22. The slim type optical disc drive of claim 21, wherein:
the control circuit comprises a spindle motor printed circuit board located at the table to control the spindle motor and a main printed circuit board attached to the housing, and
the flexible portion comprises a flexible printed circuit interconnecting the main printed circuit board and the spindle motor printed circuit board.

23. A slim type optical disc drive comprising:
a housing;
a main base mounted at the housing and on which are installed an optical pickup unit to record and/or reproduce data with respect to a rotating disc;
a table being slideable within the housing relative to the main base so as to move a disc received at a first position to a second position at which the optical pickup unit records and/or reproduces data with respect to the disc;
a spindle motor which is movable with the table, the spindle motor to receive the disc at the first position and to rotate the disc at the second position;
a control circuit mounted at the housing and which is connected to the spindle motor on the tray so as to control the spindle motor to rotate the disc while at the second position, wherein the control circuit comprises a flexible portion which is connected between the housing and the spindle motor such that the control circuit is connected to the spindle motor at the first and second positions and
the control circuit comprises a spindle motor printed circuit board located at the table to control the spindle motor and a main printed circuit board attached to the housing, and
the flexible portion comprises a flexible printed circuit interconnecting the main printed circuit board and the spindle motor printed circuit board;
side rails disposed at adjacent sides of the table; and
a connector which connects the side rails to the table, wherein:
the side rails are slideably received by the housing so as to guide a movement of the table between the first and second positions,
the side rails, the connector, and the sides of the table form gaps therebetween, and
the flexible printed circuit is disposed at one of the gaps such that, as the table moves between the first position and the second position, the flexible printed circuit can extend through the one gap.

24. The slim type optical disc drive of claim 23, further comprising an extension portion which extends from the connector towards the spindle motor and to which the spindle motor printed circuit board is attached at the table.

25. The slim type optical disc drive of claim 24, wherein the extension portion extends above the one gap so as to prevent the flexible printed circuit from contacting the disc while allowing the flexible printed circuit to extend into the gap as the table moves between the first position and the second position.

* * * * *